3,476,695
PRECIPITATED RESIN-STARCH PAPERBOARD TREATMENT
Lewis S. Miller, Bellevue, Wash., and Frederick Horowitz, Newark, Ohio, assignors to Weyerhaeuser Company, Tacoma, Wash., a corporation of Washington
Filed Aug. 5, 1965, Ser. No. 477,381
Int. Cl. C08g 37/18; C09d 3/54
U.S. Cl. 260—17.2
12 Claims

ABSTRACT OF THE DISCLOSURE

A method of increasing the rigidity or stiffness under high humidity conditions of linerboard or corrugating medium used in making corrugated shipping containers by applying to the surface of the linerboard and/or corrugating medium a phenol-formaldehyde starch resin made by adding a phenol-formaldehyde resin to an aqueous cooked starch solution in a ratio of resin solids to starch solids of 1:2 to 10:1, the phenol-formaldehyde resin having a molar ratio of formaldehyde to phenol within the range of 1:1 to 3:1, a free alkali content, expressed as sodium hydroxide, of less than 5% of the resin solids, and a water dilutability such that the solution forms a cloudy precipitate when diluted to less than 30% solids at 25° C. This resin mixture, when cured by heat, gives a linerboard or corrugating medium having a significant increase in stiffness under high humidity conditions over linerboard or corrugating medium not treated.

---

This invention relates to a process for treating cellulosic materials and to the product of such treatment. More specifically, this invention relates to a method of treating paperboard with a resin-starch material to produce treated paperboard which exhibits high resistance to compressive forces under high-humidity conditions.

Over the years the container usage market, once completely dominated by wooden boxes, has tended to use corrugated paperboard boxes as a shipping container for a wide variety of products. The development of the corrugated paper box with its high strength-to-weight ratio, ease of fabrication and versatility has caused this shift away from the use of wooden boxes. The cardinal virtue of wooden boxes is their resistance to structural failure under prolonged high-humidity conditions.

The paperboard corrugated shipping container industry has made several attempts in improving paperboard to acquire a larger portion of the market where the shipping containers are exposed to high-humidity conditions. Most of these attempts have been in some degree successful in increasing the endurance of the corrugated container under these conditions. With such developments it has been possible to store products such as produce and poultry under ice-pack conditions for a number of hours in corrugated paperboard containers. However, these storage conditions prevent the high stacking of such containers where high compression strength is required since the damp and wet conditions adversely affect the stiffness of the paperboard containers and thus reduce their ability to resist stacking forces.

One basic approach to meeting the high-humidity conditions has been by an increase in the basis weight (the pounds per thousand square feet) of the paperboard or to use multiwalls in the construction of the containers. These methods, however, add to the basic cost and weight of the resulting shipping container.

Several other methods have been employed in an effort to increase stiffness of paperboard corrugated containers without substantially increasing the board weight. Waxes and plastic films have been employed as coatings for corrugated boxes to improve their resistance to wet conditions caused by ice or free water. However, these coatings are unsatisfactory because it is impossible and usually undesirable to completely coat all surfaces and edges of the container. Impossible, because the number of folds and cuts in the walls of the container made during its converting process to a useful form often permit wicking of the moisture into the board. Undesirable, because most products such as fresh food products, which are held by such containers, must be permitted to "breathe" either by vapor passage through the containerboard or through ventilation holes in the container. If a film has been placed entirely around the container, it is not possible for the vapor to pass through the board or if ventilation holes have been cut into the container these leave edges which have been unprotected by the coating which will permit wicking through the fibers of the board. Such containers after long exposure to humid conditions will lose their rigidity almost to the same extent as untreated board due to fibrous absorption of moisture. Also, wax coatings prevent ease of bonding the boards so coated to other components of the container board structure.

Corrugated paperboard containers have also been completely converted and formed into their final shape and then by secondary treatment they have been completely wax-dipped to coat all of the surfaces and edges with a paraffin film. Such secondary treatment, while effective for some period of exposure, is quite expensive for most applications.

While the wet-end addition of wet-strength resins to increase the tensile and burst properties of paperboard is well known, the effect of such resins on edgewise rigidity is almost negligible.

There is disclosure in the patent to McKee, U.S. Patent No. 2,568,349, of the impregnation of corrugating medium with molten sulfur. High levels of treatment between 40% and 70%, as taught therein, introduce expense, broke recovery, and adhesive problems and the overall effect of the sulfur treatment in high-humidity conditions is one of delaying box failure rather than providing long-term protection of the box.

Another method for increasing the resistance to crushing in column loading at high-humidity conditions is disclosed in the patent to Rogers, U.S. Patent No. 2,973,295. In this reference there is a teaching of incorporating foams in the voids between the flutes of corrugated board.

One of the most thorough treatments of this subject has been done by D. J. Fahey, Technologist, Forest Products Laboratory, Madison, Wis. His article titled "Use of Chemical Compounds to Improve the Stiffness of Containerboard at High Moisture Conditions" appeared in the September 1962, TAPPI Journal, volume 45, No. 9, on pages 192A to 202A. In this article there is a series of disclosures concerning a variety of polymeric materials including urea, melamine, epoxy, phenolic and hydrocarbon resins, starch, carboxymethyl cellulose, lignin sulfonates, casein, animal glue and natural pine resins, which were applied to the surface of corrugating medium and linerboard, either at the wet end or smoothing press or at the size press. This article concludes with the general comment that, "While work today shows some measure of success, further research is needed to achieve a board that will retain its stiffness over the entire moisture range. There definitely is a need for more efficient cross-linking agents which can be used in conjunction with chemicals that give favorable results at low humidity to prevent weakening of bonds in the presence of moisture. Additional research with some of the more promising chemicals to produce a still stiffer treated board and yet maintain high impact and scoring resistance is also apparent."

We have discovered that combinations of starches and certain phenol formaldehyde resins may be applied to paperboard, which has a basis weight between 26 and 90 pounds per thousand square feet, and which may be subsequently converted into corrugated shipping containers to impart increased rigidity to the container. Consequently, the corrugated board and the boxes fabricated therefrom retain a substantial portion of increased rigidity, even though the corrugated container is exposed for long periods to conditions of high humidity. This invention does not reside in the use of phenolic resins or starches to increase stiffness of paper since this has long been known in both the paper and textile industries; however, the co-use of starch with phenolic resins having particular characteristics herein disclosed imparts a high-humidity stiffness improvement not obtained by the use of either starch or phenolic resin alone or by the co-use of starch and phenol formaldehyde resins not within the scope of the resins discovered and described herein.

An object of this invention is to provide a paperboard treatment for use in fabrication of corrugated shipping containers which will permit the treated containers to retain a substantial portion of dry strength properties under high-humidity or wet conditions.

Another object of this invention is to provide a treated paperboard which, when fabricated into a corrugated shipping container, will provide increased rigidity throughout a broad range of humidity conditions for prolonged periods of time without being so stiff that converting processes cause structural failures and low impact resistance.

These and other objects and advantages will become manifestly clear to those skilled in the art when taken in conjunction with the detailed specifications and drawings, wherein.

When a sheet of paperboard is considered as a sandwich construction in analyzing its mechanics, it is noted that those boards which have more rigid constituents of the sheet concentrated on or near the surfaces rather than distributed equally throughout the thickness of the sheet provide the greatest overall board rigidity. Thus, it is the preferred practice, in the treating of paperboard to increase its rigidity, to apply the treating materials to the surfaces after the web has been formed on the papermaking machine. It is further preferred to make such application after the sheet is substantially dry with 20% or less moisture content, to prevent excessive penetration of the treating material into the sheet. Thus treatment at the size press of the paper machine is preferred although application can be made at the breaker stack calendar, or as a secondary application after the paper machine. To prevent excessive embrittlement of the sheet which could cause fracturing during subsequent converting operations, such as score bending, in the case of linerboard, or fluting, in the case of corrugating medium, the amount of stiffening agent must be held at levels not in excess of that necessary to impart the desired level of increased rigidity.

While it is well known that cooked starch solutions applied alone to the surface of paperboard do result in a substantial increase in stiffness of the board at low-humidity conditions, it has been found that this increase in stiffness is entirely lost at relatively high-humidity conditions. We have found, however, that these deficiencies are overcome by the addition to a precooked starch solution of phenol formaldehyde resins having properties within the following limits: a molar ratio of formaldehyde to phenol of 1:1 to 3.0:1, the free alkali content of the treating colution, expressed as sodium hydroxide, of less than 5% of the resin solids, and a water dilutability such that the solution forms a cloudy precipitate when diluted to less than 30% solids based on the total resin plus starch solids at 25° C.

The amount of resins added to the cooked starch should be between 50% and 1000% resin solids based on the starch solids in solution. The preferred range is between 100% and 200% resin solids based on starch solids. Native starches of all varieties are effective, such as corn, potato, sago, tapioca and wheat, as well as modified or converted products therefrom.

Figure 1:
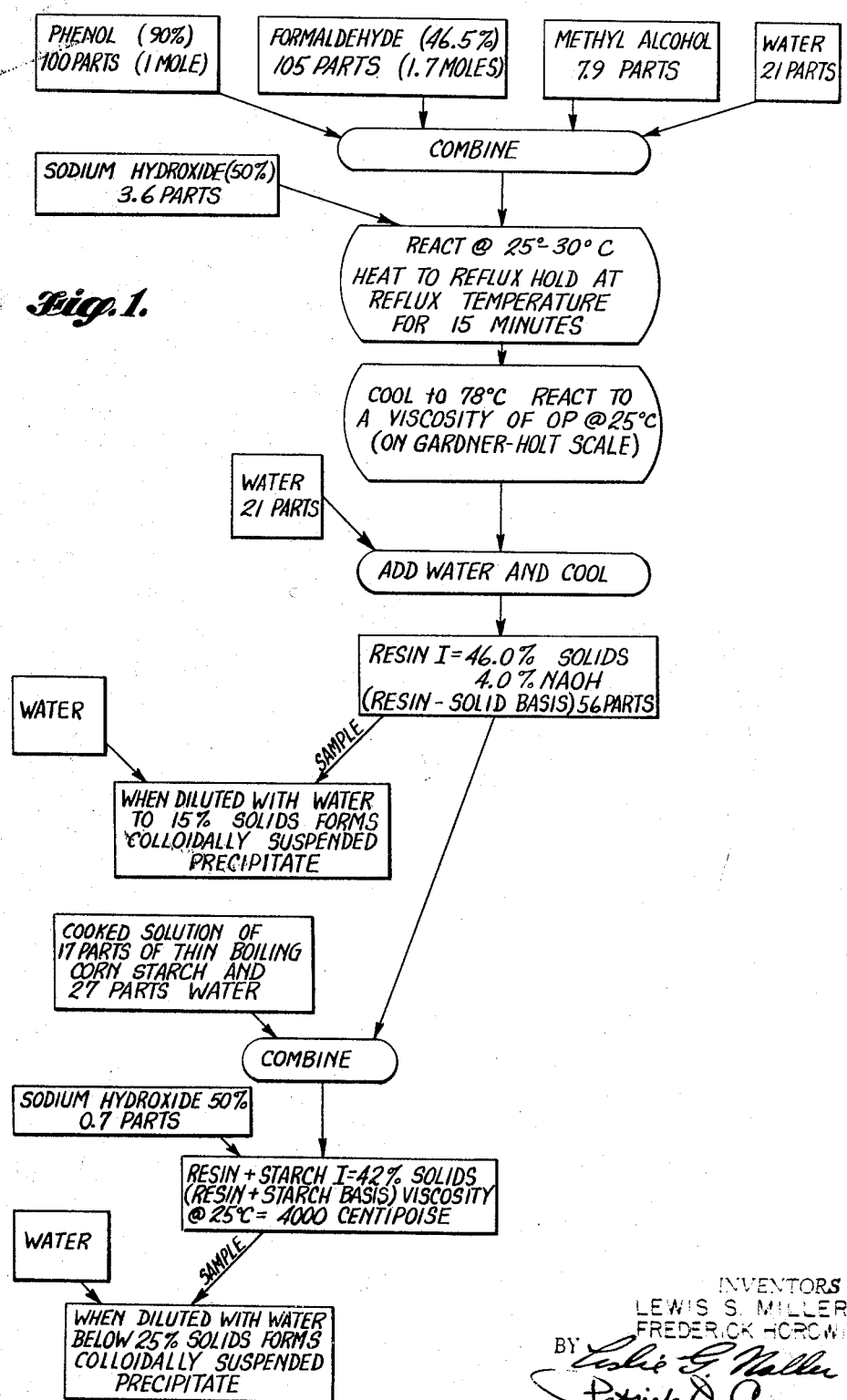
FIGURE 1 is a flow diagram schematically illustrating the process of producing the resin-starch mixture useful in treating paperboard in accordance with the present invention.

Referring now to FIGURE 1 and considering it as Example I, there is shown a flow diagram schematically illustrating the process of preparing a typical resin-starch mixture within the above-noted ranges of constituents. As shown, 100 parts of 90% phenol (1 mole) are added to 105 parts of 46.5% formaldehyde (1.7 moles). This in turn has added to it in a suitable reactor for combination 7.9 parts of methyl alcohol and 21 parts of water. To this combination there is slowly added 3.6 parts of 50% sodium hydroxide raising the temperature from approximately 25 to 30° C. This mixture is then heated to reflux and held at the reflux temperature for 15 minutes. It is then cooled to 78° C. and reacted to a viscosity of O–P measured at 25° C. on the Gardner-Holdt scale at which time 21 parts of water are added and the resin is cooled. The resulting resin contains 46% solids, 4% sodium hydroxide (based on a resin solid basis) and is dilutable with water to about 15% solids before precipitation occurs. About 56 parts of the undiluted resulting resin is added at 80° C. to a cooked solution of about 17 parts of a thin-boiling cornstarch and about 27 parts of water. The resulting mixture is cooled and about 0.7 part of 50% sodium hydroxide is added to it. The final solids content, that is, resins plus starch, is about 42% and the viscosity at 25° C. is about 4,000 centipoise. This mixture is dilutable with water to about 25% solids, at which time a colloidally suspended precipitate forms.

Figure 2:
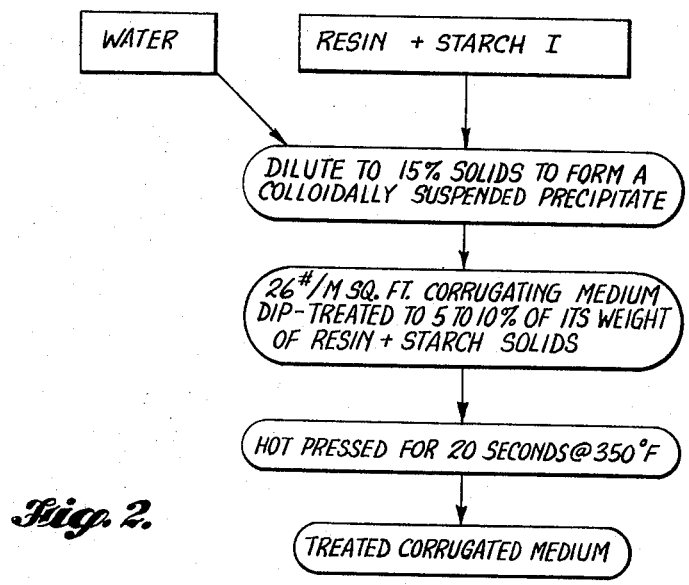
FIGURE 2 is a flow diagram schematically illustrating the process of treating corrugating medium in accordance with the present invention.

Referring now to FIGURE 2 and considering it Example II, there is shown in a flow diagram the process of treating corrugating medium, which may have a basis weight between 26 and 33 pounds per thousand square feet, with the mixture resulting from the process of Example I shown in FIGURE 1. The resin-starch mixture of Example I was diluted with water to form a colloidally suspended precipitate having 15% solids. Corrugating medium having a weight of 26 lbs. per 1,000 square feet was dip-treated with the above precipitated mixture and the treated sheets were dried in a hot press for 20 seconds at 350° F. Portions of the treated sheets were conditioned for four days at 50% relative humidity and other portions were conditioned for four days at about 90% relative humidity. These samples were then tested for ring-crush stiffness according to TAPPI Method T–472 M–51. A portion of the Example I mixture was rendered non-precipitating at 15% solids by the addition of sodium hydroxide. Additional sheets of corrugating medium were treated with this non-precipitated mixture and tested as described above.

TABLE I.—CORRUGATING MEDIUM STIFFNESS COMPARISON

| Treatment | 50% Relative Humidity | | | 90% Relative Humidity | |
|---|---|---|---|---|---|
| | Resin pickup, percent | Moisture content, percent | Stiffness, lbs. | Moisture content, percent | Stiffness, lbs. |
| Resin Example I | 7.6 | 5.3 | 68.8 | 18.3 | 27.9 |
| Resin Example I+Alkali | 12.3 | 6.6 | 75.0 | 24.4 | 21.0 |
| None | | 5.4 | 45.7 | 18.1 | 19.4 |

Table I shows a comparison of corrugating medium treated with the precipitated resin-starch, corrugating medium treated with the alkaline-rich non-precipitating resin-starch and corrugating medium which was not treated at all. It should be noted for the 50% relative humidity conditioned samples that the resin-starch precipitate treatment provided increased stiffness over non-treated corrugated medium but that the resin-starch treatment with excess alkali, causing increased resin pick-up and penetration, provided even greater stiffness; however, the samples conditioned under high-humidity conditions, of approximately 90% relative humidity, indicated that stiffness of the corrugating medium treated with the precipitated resin-starch mixture was significantly higher than either of the other two samples and that the resin-starch with excess alkali mixture provided insignificant improvement over corrugating medium having no treatment at all.

Figure 3:
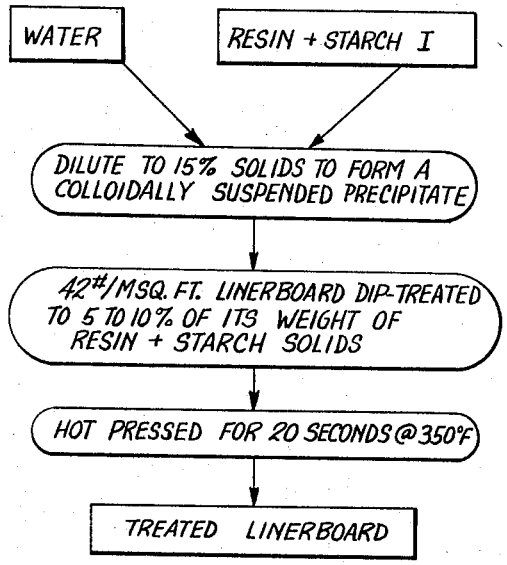
FIGURE 3 is a flow diagram schematically illustrating the process of treating linerboard in accordance with the present invention.

Referring now to FIGURE 3 and considering it as Example III, there is shown in schematic form a flow diagram for the process wherein linerboard having a weight of 42 lbs. per 1,000 sq. ft. was dip-treated with the Example I mixture and hot pressed 20 seconds at 350° F. Some portions of this linerboard were subjected to 50% relative humidity for four days and other portions to 92% relative humidity for four days. A portion of Example I mixture was also rendered non-precipitating when diluted to 15% solids by the addition of sodium hydroxide. Additional sheets of linerboard were dip-treated in the non-precipitating mixture and hot pressed 20 seconds at 350° F. Some portions of the treated sheets were then subjected to 50% relative humidity and others to 92% relative humidity for four days.

to 30° C. This mixture is then cooked at 80° C. and reacted to a viscosity of O-P measured at 25° C. on the Gardner-Holdt scale at which time it is cooled to 20° C. The resulting resin contains 48.3% solids, 1.6% sodium hydroxide (based on total solids) and is dilutable with water to about 25% solids before precipitation occurs.

The specific treatment of the paperboard after it has been coated or dip-treated with the precipitated resin-starch mixture is not critical for most end uses of the paperboard. To obtain the benefits of the increased dry stiffness it is only necessary for the board which has been treated with the precipitated resin-starch mixture to become relatively dry after such treatment. Drying is accelerated by the application of heat for a sufficient period to reduce the moisture content down to 5 to 10%. These drying conditions may bring about partial curing of the resin. Later converting procedures typically employed in the fabrication of corrugated boxboard, such as preheating and passing the board through a corrugating machine hot press section, cause the resin to become more fully cured and thus becoming suitable for exposure to high-humidity conditions. However, it is important not to fully cure the paperboard prior to these converting procedures so that it can be fluted without fracture, rip or tear.

The end use of a board treated with the precipitated resin-starch mixture might not require any significant fluting or scoring. For such uses treated paperboard could be placed in a mold or die after dip-treating to be heated and formed flat or into some other useful shape with the resins becoming completely cured due to the heat treatment. A suggested utility for such a product would be a

TABLE II.—LINERBOARD STIFFNESS COMPARISON

| Treatment | 50% Relative Humidity | | | 92% Relative Humidity | |
|---|---|---|---|---|---|
| | Resin pickup, percent | Moisture content, percent | Stiffness, lbs. | Moisture content, percent | Stiffness, lbs. |
| Resin Example I | 4.5 | 6.0 | 124 | 16.7 | 45.6 |
| Resin Example I plus Alkali | 9.0 | 6.7 | 147 | 22.4 | 35.9 |
| Control | | 6.4 | 92 | 17.2 | 36.5 |

Table II shows a comparison of the stiffness characteristics of the linerboard treated with the precipitated resin-starch mixture, the resin-starch mixture rendered non-precipitating by the addition of sodium hydroxide and linerboard without any treatment. As was the case with the corrugating medium at 50% relative humidity, the precipitated resin-starch mixture provided a significant increase in stiffness over the linerboard without any treatment but the linerboard treated with the non-precipitating resin-starch mixture provided even greater stiffness at lower conditions of relative humidity. It should be noted, however, that at the high moisture conditions the stiffness characteristics of the linerboard treated with the precipitated resin-starch mixture were significantly higher than the linerboard treated with the resin-starch mixture rendered non-precipitating and the linerboard without treatment.

Another way in which to produce a suitable resin may be referred to as Example IV, wherein 100 parts of 90% phenol provide 1 mole and are added to 166 parts of 37% formaldehyde to provide 2 moles. This in turn has added to it in a suitable reactor 32 parts of water. To this combination there is slowly added 6 parts of 50% sodium hydroxide, raising the temperature from approximately 20 tray for holding fruit in containers with the tray being molded to the shape of the fruit.

Other end uses for cellulosic fiber materials treated with the resin-starch precipitating mixture suggest themselves, such as the post treatment with the mixture of molded pulp items and the treatment of folding box and folding carton paperboard, which items may have end uses wherein stiffness under high-humidity conditions is a desirable property.

It is therefore seen that the particular treating mixture of phenolic resin and starch described above has several novel and desirable characteristics. The phenolic resin reacts with the starch during the cure of the treated paperboard rendering the starch insoluble and non-hygroscopic, thereby retaining the stiffness effects of both the starch and the resin at high-humidity conditions. The viscosity elevating properties of the starch and the precipitating character of the phenolic resin contribute toward holding the stiffening treatment mixture in or near the surfaces of the paperboard being treated. The low free-alkali content of the phenolic resin permits resin precipitation and prevents the treated paperboard from becoming excessively hygroscopic and from destroying the effects of rosin size often used in the basic composition of paperboards used as linerboards. The presence of the starch aids the suspension of the precipitated portions of the resin in the diluted treating solution. It is also believed that little or no penetration of the cellulosic fiber-walls occurs when the paperboard is treated with the phenolic resin-starch in a precipitated form described above, thus avoiding excessive embrittlement of the treated paperboard.

It is therefore seen that by means of the above-described treatment the stiffness properties of paperboard can be increased at not only low-humidity conditions but substantially increased over untreated and previously known treatments of paperboard at high-humidity conditions.

While the foregoing discussion has been primarily concerned with the treatment of paperboard, it should be recognized that the stiffness characteristics provided by the described treating mixture would also be useful in other applications to treat fibrous material having physical characteristics similar to cellulosic fibers.

Having now described our invention and in what manner the same may be used, what we claim as new and desire to protect by Letters Patent is:

1. A method of increasing the rigidity of cellulosic fiber material under high humidity conditions which comprises:
   (a) applying to the surface of the cellulosic fiber material a phenol-formaldehyde starch resin made by adding a phenol-formaldehyde resin to an aqueous solution of cooked starch in a ratio of resin solids to starch solids of 1:2 to 10:1, the phenol-formaldehyde resin having a molar ratio of formaldehyde to phenol within the range of 1:1 to 3:1, a free alkali content, expressed as sodium hydroxide, of less than 5% resin solids, and a capability of forming a colloidally suspended precipitate when diluted with water to less than 30% solids at 25° C.,
   (b) diluting the phenol-formaldehyde starch resin mixture with water until a colloidally suspended precipitate is formed, and
   (c) curing the phenol-formaldehyde starch resin mixture.

2. The product of the method of claim 1.

3. The method according to claim 1 wherein the ratio of resin solids to starch solids ranges from 1:1 to 2:1.

4. The method according to claim 1 wherein the cellulosic fiber material is paperboard.

5. The method according to claim 4 wherein 3–10% of the phenol-formaldehyde starch resin is applied to the paperboard based on the dry base weight of the paperboard.

6. The method according to claim 1 wherein the mole ratio of formaldehyde to phenol is about 1.7:1 and the ratio of resin solids to starch solids ranges from 1:1 to 2:1.

7. The method according to claim 6 wherein the cellulosic fiber material is a corrugating medium with a basis weight from 26 to 33 pounds per thousand square feet.

8. The product of the method of claim 7.

9. The method according to claim 6 wherein the cellulosic fiber material is linerboard having a basis weight in the range between 26 to 90 pounds per thousand square feet.

10. The product of the method of claim 9.

11. A method of manufacturing a composition of matter, which comprises:
    (a) forming a phenol formaldehyde resin having a molar ratio of formaldehyde to phenol within the range between 1:1 to 3.0:1 and containing less than 5% free alkali expressed as sodium hydroxide,
    (b) reacting the combination of step (a) until a sample of it forms a colloidally suspended precipitate when diluted with water to less than 30% solids at 25° C.,
    (c) combining the non-diluted resin of step (b) with cooked starch with the ratio of resin solids to starch solids within the range of 1:2 to 10:1, and
    (d) diluting the combination of step (c) with water until a colloidally suspended precipitate is formed.

12. The composition of matter resulting from the process of claim 11.

References Cited

UNITED STATES PATENTS

| 1,673,797 | 6/1928 | Brown | 260—29.3 |
| 1,917,020 | 7/1933 | Dent | 260—29.3 |
| 1,976,433 | 10/1934 | Cheetham | 260—29.3 |
| 2,190,672 | 2/1940 | Meharg | 260—29.3 |
| 2,362,274 | 11/1944 | Hurst | 260—29.3 |
| 2,806,787 | 9/1957 | Toulmin | 260—17.2 |
| 2,884,389 | 4/1959 | Corwin et al. | |
| 3,033,708 | 5/1962 | McKee | 117—119.8 |

OTHER REFERENCES

Chem. Abstract, vol. 52: 7696b, "Continuous Starch Cooking etc.," (Chinn).

Chem. Abstract, vol. 64: 3830f, "Phenolic Resin Treatment Improves Fiberboard Compressive Strength," Koning et al.

HAROLD D. ANDERSON, Primary Examiner

E. WOODBERRY, Assistant Examiner

U.S. Cl. X.R.

117—155, 156, 161